United States Patent [19]

Jambor et al.

[11] Patent Number: 4,741,557
[45] Date of Patent: May 3, 1988

[54] SAFETY-BELT ARRANGEMENT IN A VEHICLE

[75] Inventors: Arno Jambor, Vaihingen/Enz; Gerhard Brodbeck, Schonaich; Gerhard Busch, Gechingen; Jürgen Heuberger, Pliezhausen-Gniebel, all of Fed. Rep. of Germany

[73] Assignee: Daimler-Benz Aktiengesellschaft, Stuttgart, Fed. Rep. of Germany

[21] Appl. No.: 921,410

[22] Filed: Oct. 22, 1986

[30] Foreign Application Priority Data

Oct. 22, 1985 [DE] Fed. Rep. of Germany ....... 3537519
Jun. 13, 1986 [DE] Fed. Rep. of Germany ....... 3619934

[51] Int. Cl.$^4$ ............................................. B60R 22/02
[52] U.S. Cl. ..................................... 280/808; 297/481
[58] Field of Search ..................... 280/808, 802, 801; 297/483, 469

[56] References Cited

U.S. PATENT DOCUMENTS 3,856,327 12/1974 Otani .................................. 280/802
4,629,214 12/1986 Föhl .................................... 280/808

FOREIGN PATENT DOCUMENTS

3018309A1 11/1981 Fed. Rep. of Germany .
3225862A1  1/1984 Fed. Rep. of Germany .
3343619C1  9/1985 Fed. Rep. of Germany .
0006050   1/1986 Japan ................................... 280/808

Primary Examiner—John J. Love
Assistant Examiner—Karin L. Ferriter
Attorney, Agent, or Firm—Barnes & Thornburg

[57] ABSTRACT

The proposed safety-belt arrangement in a vehicle has a three-point belt, for which an upper deflecting fitting, together with a guide part of a belt feeder arm, is retained on the vehicle center column so as to be vertically adjustable on a common support. The belt lug of the feeder arm can consequently be made as small as possible, while still accommodating passengers of varying sizes.

24 Claims, 3 Drawing Sheets

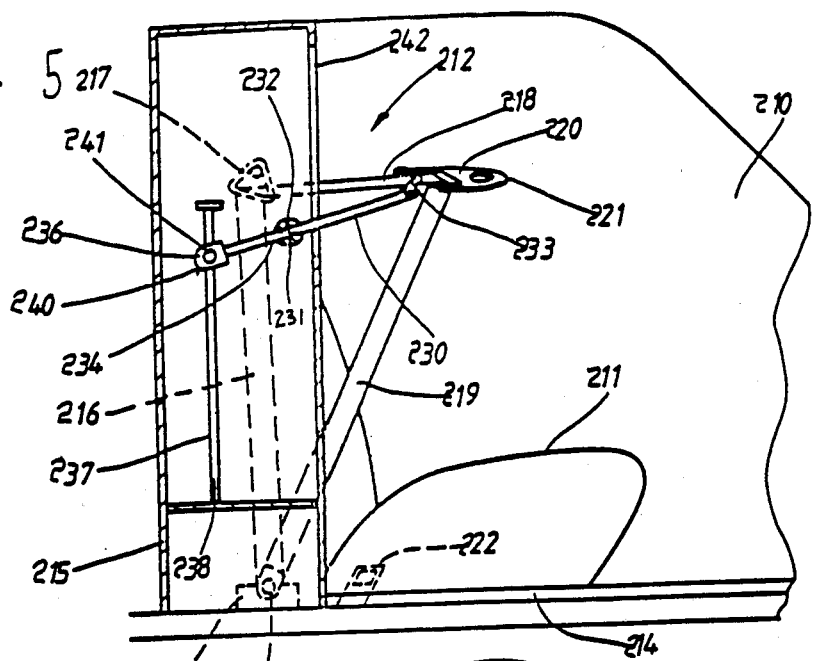
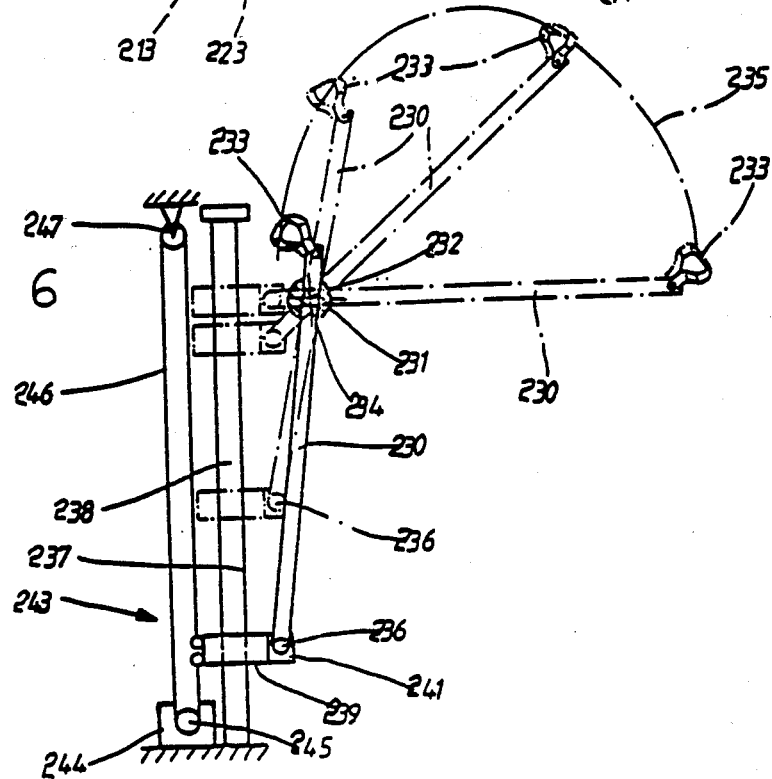

SAFETY-BELT ARRANGEMENT IN A VEHICLE

BACKGROUND AND SUMMARY OF THE INVENTION

The invention relates to a safety-belt arrangement in a vehicle, especially a passenger car, of the type having a retractable belt and a feeder arm which engages the belt to move the same from a retracted position toward a feed position where the passenger can readily grasp and buckle the same.

In a known safety-belt arrangement of this type (German Offenlegungsschrift No. 3,302,356), the feeder arm is arcuate and is retained in a guide tube as a guide part on the center column of the vehicle, and a drive device engages on the feeder arm and can move the latter between the position of rest and the feed position. The safety belt is designed as a three-point belt, the holder of which is in the form of an upper deflecting fitting. It is known to arrange the upper deflecting fitting so as to be vertically adjustable along the vehicle center column, in order to adapt the safety belt to vehicle occupants of varying sizes.

Because the upper deflecting fitting of the safety belt is vertically adjustable, the belt lug at the free end of the feeder arm has to be made very large, so that it can cover the entire range of vertical adjustment of the belt band guided through it. Such a large belt lug is not only a hindrance in the position of rest since it projects on both sides when the center column is narrow, but it also has a disturbing effect in the feed position.

An object on which the invention is based is to provide a safety-belt arrangement of the type mentioned above, in which, despite the adaptability to vehicle occupants of varying sizes, the belt lug of the feeder arm can be made small, compact, as space-saving as possible and unobtrusive.

According to the invention, this object is achieved by providing that the deflecting belt holder and the guides for the feeder arm are coupled as a unit for vertical adjusting movements. Advantageous further features of preferred embodiments of the invention relate to various constructional details, including embodiments with arcuate feeder arms, guided by tubular guide parts and embodiments with pivotally supported feeder arms. Since, according to the invention, both the deflecting belt holder fitting and the guide part guiding the feeder arm are jointly retained on a support and consequently form a single unit which is vertically adjustable as a whole, the particular relative position between the belt lug of the feeder arm and the deflecting fitting is thereby maintained. The belt lug can therefore be made small, so that it requires only a small amount of space, is unobtrusive and inconspicuous and in a position of rest does not extend beyond the center column even when the latter is narrow.

Further objects, features, and advantages of the present invention will become more apparent from the following description when taken with the accompanying drawings(s) which show, for purposes of illustration only, an embodiment/several embodiments in accordance with the present invention.

BRIEF DESCRIPTION OF THE DRAWINGS

FIG. 5 shows a diagrammatic side view, in vertical section, of parts of a motor vehicle with a safety-belt arrangement constructed in accordance with another preferred embodiment of the invention, specifically as seen from outside the vehicle and showing the front passenger seats; and FIG. 6 shows a diagrammatic side view of details of a feeder arm of a safety-belt arrangement in various positions, similar to the FIG. 5 arrangement.

DETAILED DESCRIPTION OF THE DRAWINGS

Figure 1:
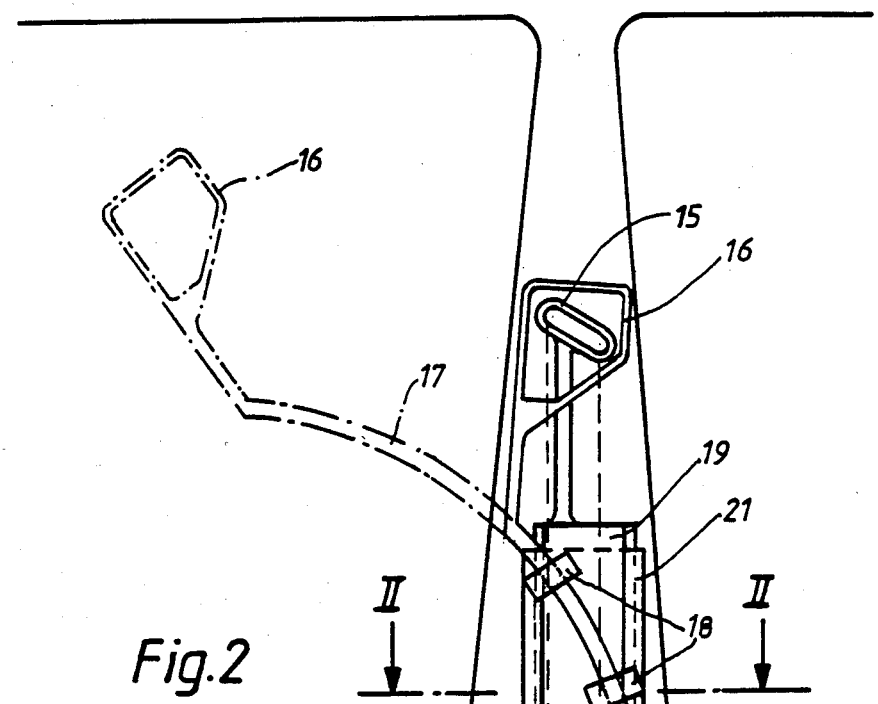
FIG. 1 is a diagrammatic side view of a safety-belt arrangement in a passenger car constructed in accordance with a preferred embodiment of the invention, with the feeder arm retracted into the position of rest, parts of the belt band merely being indicated by broken lines.

FIG. 1 shows diagrammatically part of a passenger car 10, specifically its center column 11, also called a B-column. Retained on Column 11 is a safety belt 12 comprising, for example, a conventional three-point belt, the belt band 13 of which is drawn off from a lower belt-reeling mechanism 14 attached, for example, to the vehicle seat, to the vehicle side wall or, as indicated, at the bottom on the center column 11. The belt band 13 leads from the belt-reeling mechanism 14 along the center column 11 up to an upper holder 15 which here is designed as an upper deflecting fitting for the belt band 13 and which causes the belt band 13 to be deflected into the upper end of a shoulder-belt portion of the belt band. From there, the belt band 13 or a catch (not shown) of the belt band leads to a belt lug 16 which is located at the free end of a feeder arm 17. The feeder arm 17 is movable along guide parts 18 from a position of rest shown in FIG. 1 into a feed position pulling the belt band 13 forwards, and back again. For this purpose, a drive not shown in any more detail, which is arranged in the vehicle, engages on the feeder arm 17.

It has been contemplated to attach the holder 15, in the form of the defelcting fitting, to the center column 11 so as to be vertically adjustable as an independent part. It has also been contemplated to attach the guide part 18 likewise to the vehicle, for example to the center column 11 or its trim covering, independently of holder 15. If the vertical adjustment range of the vertically adjustable holder 15, in the form of the defelecting fitting which shifts vertically in relation to the spatial position of the feeder arm 17 and its belt lug 16, is to be taken into account, then the belt lug 16 has to be made relatively large, and this takes up a large amount of space and causes disturbance and also looks ugly.

Figure 2:
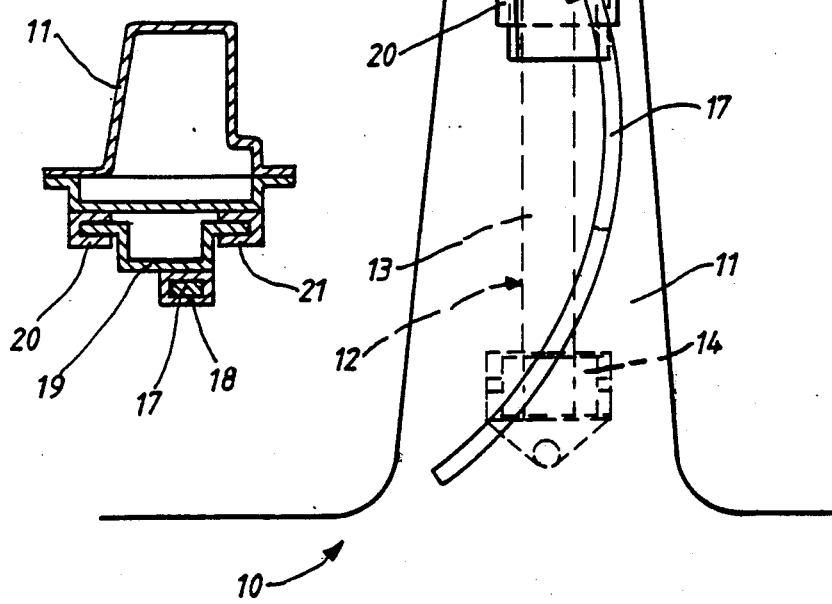
FIG. 2 shows a diagrammatic sectional view taken along the line II—II in FIG. 1.

The invention avoids these disadvantages by coupling both the holder 15 in the form of the deflecting fitting and the guide part 18 of the feeder arm 17 to one another to form a single unit and retaining them on the passenger car 10 so as to be jointly adjustable vertically. For this purpose, there is a support 19 which is retained so as to be vertically adjustable in the height direction of the center column 11, for example along guide support elements 20, 21 fixed to the vehicle on both sides. On the one hand the holder 15 in the form of the deflecting fitting and on the other hand the guide part 18 for the feeder arm 17 are retained on the support 19 so as to be vertically adjustable jointly as a single unit. FIG. 2 shows that the guide part 18 is attached rigidly to the support 19, with the result that the guide part 18 and the holder 15 in the form of the deflecting fitting form a rigid unit.

The feeder arm 17 is formed from an arcuate part with a belt lug 16 attached at the free end. The guide part 18 consists, here, of two guide sleeves which are arranged at a distance from one another along the arc and which receive the feeder arm 17 inside these surrounding guide sleeves.

In another exemplary embodiment (not shown), instead of two guide sleeves there is a guide tube constructed as a guide part, which guide tube extends over a segment of the arc of the feeder arm 17 and which offers sufficient guide length for guiding movement of the feeder arm 17.

Figure 3:
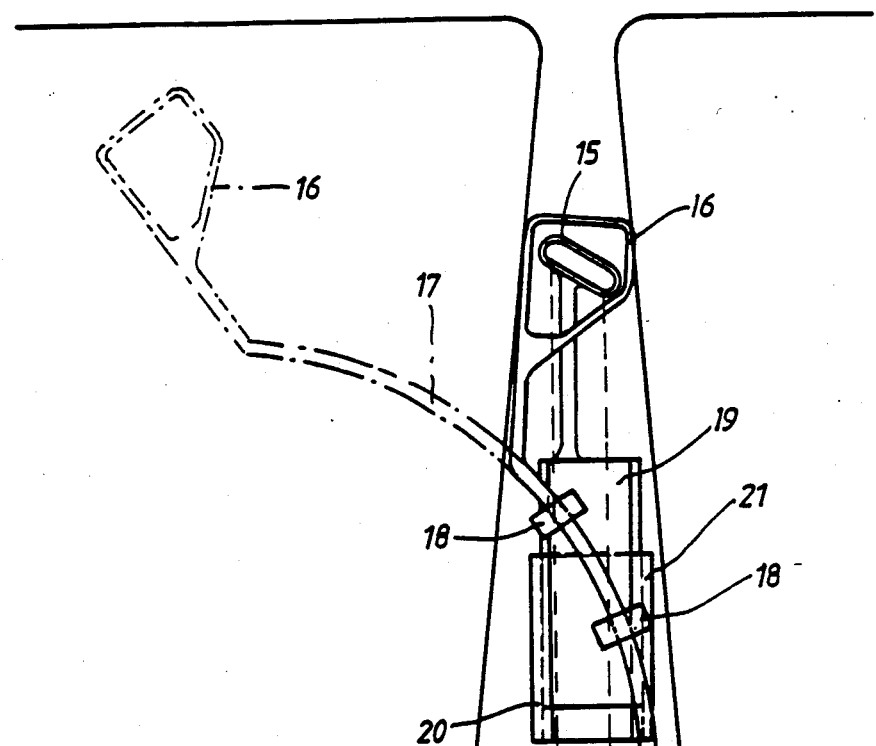
FIG. 3 shows a diagrammatic side view of the safety belt arrangement of FIG. 1, but in a position shifted further upwards relative to the FIG. 1 depiction.
Figure 4:
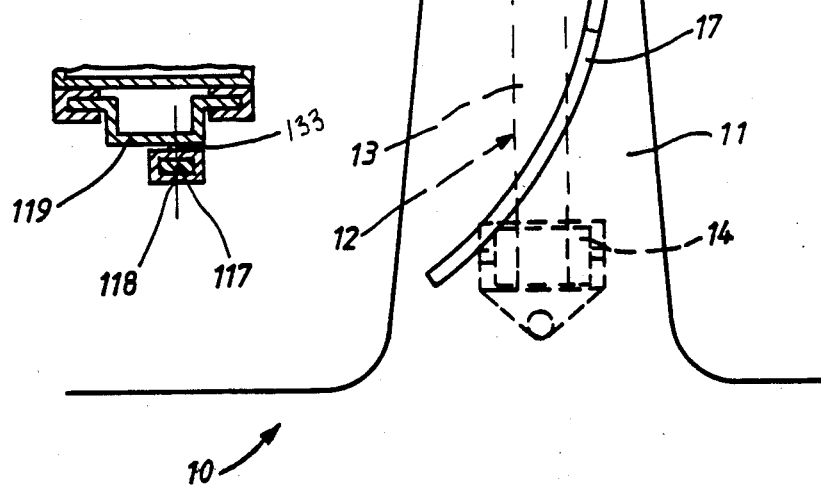
FIG. 4 shows a diagrammatic section, corresponding approximately to that of FIG. 2, of a modified exemplary embodiment.

In the second exemplary embodiment illustrated in FIG. 4, reference numerals increased by a hundred are used for the parts corresponding to those of the first exemplary embodiment of FIGS. 1 and 3, and reference is made to the above description of these corresponding parts.

In the second exemplary embodiment of FIG. 4, the guide part 118 of the feeder arm 117 is retained pivotably on the support 119 by means of a pivot pin 133 indicated diagrammatically. In another exemplary embodiment (not shown), the guide part of the feeder arm is coupled to the support via a coupling rod or such like coupling elements mounted in an articulated manner.

When the height of the holder 15 in the form of the upper deflecting fitting is to be adjusted to adapt to the sitting height of the vehicle occupant, this is carried out by adjusting the height of the support 19, 119. At the same time, the guide part 18, 118 and the feeder arm 17, 117 mounted in it are consequently also adjusted vertically as a single unit. This ensures that, during the height adjustment, the belt lug 16 of the feeder arm 17 always maintains the same relative height in relation to the holder 15 in the form of the deflecting fitting, so that the belt lug 16 only has to be made as large as is absolutely necessary. The belt lug 16 can therefore be made relatively small, compact and space-saving.

Other preferred embodiments schematically depicted in FIGS. 5 and 6 utilize a feeder arm which is pivotally guided at a pivot guide support which also permits guided axial movement of the feeder arm through the pivot guide support. With this arrangement, the travel path of the end of the feeder arm engageable with the belt can be guided along a predetermined arcuate path.

The motor vehicle 10 indicated diagrammatically in FIG. 5 is equipped with a safety-belt arrangement 212 in the region of the front passenger seat 211. This arrangement is designed as a three-point belt. It has a belt-reeling mechanism 213 which is fastened in the lower region of the motor vehicle 210, for example to the door sill 214 or to an approximately vertical support means or body part 215, especially a center column or so-called B-column, which is shown enlarged for the sake of better understanding. Stored in the belt-reeling mechanism 213 is part of the belt band 216 which leads from the belt-reeling mechanism 213 approximately vertically upwards to an upper defelcting shackle 217 and which, when pulled out as shown in FIG. 5, from there forms a shoulder belt 218 and pelvis belt 219, between which a lug 220 with a locking part 221 on it is arranged on the belt band 216 usually displaceably, this lug being insertable into a belt lock 222 fixed to the vehicle for the purpose of locking by means of its locking part 221. The end of the belt band 216 is anchored on the motor vehicle 210 by means of a fitting 223 in the lower region, for example on the door sill 214 or body part 215.

The safety-belt arrangement 212 is also equipped with a feeder arm 230 which is mounted on the motor vehicle 210 by means of a pivot bearing 231, indicated merely diagrammatically, so as to be pivotable about an axis 232 extending transversely relative to the feeder arm 230 and approximately horizontally. The pivot bearing 231 comprises, for example of a disc which is mounted so as to be freely rotatable about the axis 232.

The feeder arm 230 at its free and carries a catch 233, for example in the form of an eyelet, which engages on the belt band 216 between the shoulder belt 218 and the pelvis belt 219. When the catch 233 is designed as an eyelet, the belt band 216 can run through this eyelet. The catch 233 is appropriately shaped in such a way that, in the various positions when the safety belt is pulled out, it always engages on lug 220 so as to cause as little disturbance as possible and also avoid causing injury. It is merely necessary for it to butt against the lug 220.

The feeder arm 230 can be actuated so as to pivot about the axis 232 from a position of rest, shown by unbroken lines in FIG. 6, into a feed position shown in FIG. 5, in which the belt band 16 is pulled forwards ready for fastening, and back again.

In a particular design of the safety-belt arrangement 212, the feeder arm 230 is held on or in the pivot beaing 231 so that it can be shifted relative to the pivot bearing 231 in the direction of the arm, and in the illustrated design of the feeder arm 230 as a straight rod consequently in the longitudinal direction of the arm. If the feeder arm 230 consists, for example, of a rod of round cross-section, the pivot bearing 231 has, for example, a diametral bore 234 through which the feeder arm 230 passes and in which the latter is mounted slideably. In another exemplary embodiment, the feeder arm 230 passes through a bush which is connected firmly to the pivot bearing 231 pivotable about the axis 232.

The relative shift of the feeder arm 230 in relation to the pivot bearing 231 is controlled in such a way that the feeder arm 230 with the end carrying the catch 233 is movable between its position of rest (FIG. 6) and the feed position along an arcuate path which is indicated by a dot-and-dash line at 235 in FIG. 6 and which, during the movement from the position of rest to the feed position, is directed first from the bottom upwards and then from the top downwards. At the same time, the shift of the feeder arm 230 is controlled so that, in its position of rest according to FIG. 6, it extends at least essentially vertically, whereas in its feed position (FIG. 5) it extends at least essentially horizontally.

The feeder arm 230 projects beyond the pivot bearing 231 by its end 236 located opposite catch 233. A force for the control movement of the feeder arm 230 is exerted on this projecting end 236. The end 236 is guided along a guide track 237 which is fixed to the vehicle and which, in the exemplary embodiment illustrated, extends vertically and is formed, for example, by the outer face of a guide rod 238, along which the projecting end 236 is positively guided and can be shifted. For this purpose, there runs on the guide rod 238, for example, a slide member 239 or a lug 240 indicated diagrammatically in FIG. 6 and 5 respectively, on which the end 236 of the feeder arm 230 is articulated so as to be pivotable about an axis 241 which, for example, is approximately parallel to the axis 231.

The pivot bearing 231 and the guide rod 238 together with the guide track 237 and slide 239 or lug 240 are arranged inside the vertical body part 215, covered with trim towards the vehicle interior, and are therefore invisible from outside. The same also applies to the feeder arm 230 which, in its position of rest, is mounted at least essentially completely in the body part 215 and is invisible from outside, the end of the feeder arm 230 carrying the catch 233 being guided out of the body part 215 through an approximately slit-shaped orifice 242, thus allowing it to be shifted longitudinally and rotated about the axis 232.

There engages on the feeder arm 230, for example on its end 236, or on the slide 239 or lug 240 (FIG. 2) a drive device 243 which, when actuated, shifts the slide 239 upwards on the guide rod 238 into the positions represented by dot-and-dash lines in FIG. 6 and which, to return the feeder arm 230 to its position of rest, shifts the slide 239 in the opposite direction again into the initial position according to FIG. 6. The drive device can be of various types, for example can consist of a hydraulic or pneumatic operating cylinder or can have a design similar to that of the drive of an extendable and retractable electrical power-driven aerial, such as is known on motor vehicles.

FIG. 6 illustrates an embodiment of a drive device 243 having a drive motor 244 which drives a pulley 245 coaxial relative to this. A drive belt 246 runs over the pulley 245 and is defelcted in the upper region by means of a deflecting roller 247, its two ends engaging on the slide 239. The drive motor 244 is controlled, for example, via a door-contact switch or a switch to be accuated by hand. When such a switch is actuated after the passenger has entered the vehicle, the drive motor 244 is switched on in one direction of rotation and via the drive belt 246 the slide 239 is shifted upwards in FIG. 2 on the guide rod 238 out of the lower position of rest. During this movement, the pivot bearing 231 pivots about the axis 232, and at the same time the feeder arm 230 is shifted longitudinally relative to the pivot bearing 231, in particular is pushed out through the bore 234 in the pivot bearing 231 with an increasing projecting length. At the same time, the catch 233 travels along the arcuate path 235. The lug 220 taken along by the catch 233 and/or the belt band 216 taken along by catch 233 are thereby pulled out forwards into the position shown in FIG. 5, in which the belt band and the lug 220 with the locking part 221 are now in a favourable position within reach of the vehicle occupant. The latter can now grasp the lug 220 in a simple way, lay the shoulder belt 218 and pelvis belt 219 round the upper part of his body and insert the locking part 221 into the belt lock 222. The belt lock 222 can contain a switch which is likewise connected to the power supply circuit of the drive motor 244 and which is actuated as a result of the insertion of the locking part 221, causing a drive movement of the drive device 243 in the opposite direction, during which the slide 239 in FIG. 6 is moved back into the initial position shown from the top downwards via the drive belt 246. This results in a movement of the catch 233 in the opposite direction along the arcuate path 235, until the feeder arm 230 has disappeared practically completely in the body part 215.

In another exemplary embodiment (not shown), the guide track 237 extends not in a straight line, but obliquely or in a curve, to obtain for the movement of the feeder arm 230 an arcuate path which is better suited to the conditions of space in the motor vehicle 210. Furthermore, in an exemplary embodiment (e.g., see FIGS. 1 and 3), the feeder arm 230, instead of being the straight part illustrated, can likewise be curved, for example arcuate, if this is expedient for reasons of space. In another exemplary embodiment (not shown), the free end 236 is guided by a guide rail, in which a sliding part runs on the end 236.

In especially advantageous exemplary embodiments, the upper defelction point, in particular the upper deflecting shackle 217, of the belt is adjustable in terms of height. It is especially advantageous according to the invention, at the same time, if the system of the feeder arm 230 is linked to this height adjustment, as a result of which, whenever the height of the upper deflection point is adjusted, the feeder arm 230 is so arranged that, in its initial position, the lug 220 always has the same relative position in relation to this upper deflection point, in particular the deflecting shackle 217.

Since the feeder arm 230 executes an essentially linear vertical movement when it is being extended, it is sufficient merely to link the feeder arm 230 to the height adjustment of the upper deflection point, for example at its end located opposite the end carrying the catch 233, thus producing different initial positions of this end of the feeder arm 230 which are assigned to the particular height adjustments. The pivot bearing 231 of the feeder arm 230 is preferably adjustable in height together with the feeder arm 230 and is linked to the height adjustment of the upper deflecting shackle 217, so that it is also adjusted correspondingly together with the height adjustment of the latter.

In the exemplary embodiment shown in FIG. 6, the pulley 245 can be coupled to the drive motor 244, for example via a centrifugal clutch. In this case, the pulley 245 is freely rotatable without the drive motor 244 being switched on. The height of the feeder arm 230 is thereby freely adjustable by means of the slide 239.

From the preceding description of the preferred embodiments, it is evident that the objects of the invention are attained, and although the invention has been described and illustrated in detail, it is to be clearly understood that the same is by way of illustration and example only and is not to be taken by way of limitation. The spirit and scope of the invention are to be limited only by the terms of the appended claims.

What is claimed is:

1. Safety-belt arrangement in a vehicle, especially a passenger car, comprising: a shoulder belt which in its upper region engages on a holder, and with a feeder arm which has a belt lug located at its end and engaging on the belt and wherein the feeder arm is movable on a guide part on the vehicle from a position of rest into a feed position pulling the belt band forwards, and back again, both the holder and the guide part being retained on the vehicle, wherein the holder and the guide part of the feeder arm are coupled to one another to form a single unit and are retained on the vehicle so as to be jointly adjustable vertically.

2. Safety-belt arrangement according to claim 1, wherein a support is provided which is retained on the guide on the vehicle so as to be vertically adjustable relative to the latter and on which are retained the holder and the guide part of the feeder arm.

3. Safety-belt arrangement according to claim 2, wherein the holder attached to the support is designed as an upper deflecting fitting of the belt which by means of the support is vertically adjustable together with the guide part of the feeder arm.

4. Safety-belt arrangement according to claim 3, wherein the feeder arm is formed from an arcuate part with a belt lug located at its end, and in that the guide part has a guide tube or at least two guide sleeves which are arranged at a distance from one another along the arc and which are retained on the support fixedly or in an articulated manner.

5. Safety-belt arrangement according to claim 2, wherein the feeder arm is formed from an arcuate part with a belt lug located at its end, and in that the guide part has a guide tube or at least two guide sleeves which are arranged at a distance from one another along the arc and which are retained on the support fixedy or in an articulated manner.

6. Safety-belt arrangement according to claim 1, wherein the holder and the guide part of the feeder are coupled rigidly to one another to form a unit.

7. Safety-belt arrangement according to claim 1, wherein the holder and the guide part of the feeder arm are coupled into a unit so as to be pivotable relative to one another.

8. Safety-belt arrangement according to claim 7, characterized by a pivot pin by means of which the guide part of the feeder arm is retained pivotably on a support moveable on the guide.

9. Safety-belt arrangement according to claim 1, wherein the feeder arm is formed from an arcuate part.

10. Safety belt arrangement for a passenger car or the like, comprising:
retractable belt means,
belt holder means for holding the belt means,
feeder arm means engageable with the belt means and movable between retracted and withdrawn positions of the belt means, and
guide part means for guiding movement of the feeder arm means,
wherein the guide part means and belt holder means are coupled together and are retained at a vehicle support means to be jointly adjustable to accommodate use by different size passengers.

11. Safety belt arrangement according to claim 10, wherein said belt means is a three-point belt, including portions serving as shoulder belt means and portions serving as lap belt means configured as an upper deflecting fitting for the belt means, and wherein the guide part means and belt holder means are coupled to one another to form a single unit which is vertically adjustably held at the vehicle support means.

12. Safety belt arrangement according to claim 11, wherein said belt holder means and guide part means are attached to a movable guide means which is slidably slide at the relatively fixed vehicle support means.

13. Safety belt arrangement according to claim 12, wherein said guide part means are pivotally attached to the movable slide member.

14. Safety belt arrangement according to claim 12, wherein said guide part means are fixedly attached to the movable slide member.

15. Safety belt arrangement according to claim 12, wherein said feeder arm means is an arcuate shaped member which includes a belt lug engaging part at its end and wherein said guide part means comprises a tubular guide portion through which the feeder arm means extends.

16. Safety belt arrangement according to claim 11, wherein said guide part means includes a pivot connection for the feeder arm means, and wherein said pivot connection and said belt holder means are linked together for joint adjusting movement.

17. Safety belt arrangement according to claim 10, wherein said guide part means includes a pivot connection for the feeder arm means, and wherein said pivot connection and said belt holder means are linked together for joint adjusting movement.

18. Safety-belt arrangement according to claim 10, wherein the feeder arm is formed from an arcuate part.

19. Safety-belt arrangment in a vehicle, especially a passenger car, with a belt band which forms especially a shoulder and pelvis belt, is delivered from a belt-reeling mechanism via an upper deflecting belt holder adjustably mounted to the vehicle, carries, in the region between the shoulder belt and pelvis belt, a lug with a locking part insertable into a belt lock and at one end is anchored firmly to the vehicle, and with a feeder arm which is mounted on the vehicle so as to be pivotable by means of a pivot bearing about an axis extending transversely to the latter and approximately horizontally, at the free end carries a catch engaging on the belt band, especially on the lug, and can be actuated so as to pivot from a position of rest into a feed position pulling the belt band forwards, and back again, and wherein the feeder arm is held on or in the pivot bearing so that it can be shifted in the longitudinal direction of the arm, relative to the pivot bearing, and this relative shift is controlled in such a way that the feeder arm, with its end carrying the catch, is movable along an arcuate path between the position of rest and the feed position, and wherein the belt holder and the pivot bearing for the feeder arm are supported for joint vertical adjusting movement.

20. Safety-belt arrangement according to claim 19, wherein the shift of the feeder arm is controlled in such a way that, in its position of rest, it extends at least essentially vertically and, in its feed position, it extends at least essentially horizontally, and during the movement from the position of rest into the feed position the catch is movable along the arcuate path first vertically upwards and then vertically downwards.

21. Safety-belt arrangement according to claim 19, characterized in that the feeder arm is designed as a straight rod.

22. Safety-belt arrangement according to claim 21, wherein the projecting and of the feeder arm is guided along a guide track preferably fixed to the vehicle.

23. Safety-belt arrangement according to claim 19, wherein an end of the feeder arm opposite the catch projects beyond the pivot bearing and that a force for the control movement is exerted on this projecting end.

24. Safety-belt arrangement according to claim 23, characterized in that the guide tract extends at least essentially vertically.

* * * * *